United States Patent
Ogawa et al.

(10) Patent No.: US 9,561,738 B2
(45) Date of Patent: Feb. 7, 2017

(54) CONTROL APPARATUS OF ELECTRICALLY-DRIVEN VEHICLE

(75) Inventors: Yasufumi Ogawa, Tokyo (JP); Keiichi Enoki, Tokyo (JP); Takuya Tamura, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 14/131,307

(22) PCT Filed: Oct. 26, 2011

(86) PCT No.: PCT/JP2011/074609
§ 371 (c)(1),
(2), (4) Date: Jan. 7, 2014

(87) PCT Pub. No.: WO2013/061412
PCT Pub. Date: May 2, 2013

(65) Prior Publication Data
US 2014/0156130 A1    Jun. 5, 2014

(51) Int. Cl.
*B60L 9/00* (2006.01)
*B60L 11/00* (2006.01)
(Continued)

(52) U.S. Cl.
CPC .......... *B60L 15/20* (2013.01); *B60L 3/04* (2013.01); *B60L 7/003* (2013.01); *B60L 11/1861* (2013.01);
(Continued)

(58) Field of Classification Search
CPC .......... B60W 20/00; B60W 10/08; H02P 3/12; H02P 3/22; H02H 7/122; B60L 15/20; Y02T 10/7044
(Continued)

(56) References Cited

U.S. PATENT DOCUMENTS

2002/0097020 A1* 7/2002 Ueno ................. B60L 11/1881
                                                              318/783
2006/0152196 A1   7/2006 Matsumoto et al.
(Continued)

FOREIGN PATENT DOCUMENTS

DE   112006000511 T5   1/2008
DE   102008048463 A1   5/2009
(Continued)

OTHER PUBLICATIONS

Communication dated Sep. 2, 2014, issued by the Japan Patent Office in corresponding Japanese Application No. 2013-540537.
(Continued)

*Primary Examiner* — Isaac Smith
(74) *Attorney, Agent, or Firm* — Sughrue Mion, PLLC; Richard C Turner

(57) ABSTRACT

A control apparatus of an electrically-driven vehicle controls an electrically-driven vehicle including a motor transmitting a drive force to wheels, an inverter driving the motor, and a battery supplying power to the inverter. The control apparatus includes battery storage amount estimation means for estimating a storage amount of the battery and motor rotation speed detection means for detecting a rotation speed of the motor. Output terminals of the inverter are short-circuited when the rotation speed of the motor reaches or exceeds a predetermined rotation speed while the storage amount estimated by the battery storage amount estimation means is equal to or greater than a predetermined amount.

8 Claims, 12 Drawing Sheets

(51) Int. Cl.
*G05D 1/00* (2006.01)
*B60L 15/20* (2006.01)
*B60L 3/04* (2006.01)
*B60L 7/00* (2006.01)
*B60L 11/18* (2006.01)
*H02P 3/22* (2006.01)
*H02H 7/122* (2006.01)
*H02P 101/45* (2015.01)

(52) U.S. Cl.
CPC ............... *H02P 3/22* (2013.01); *H02H 7/122* (2013.01); *H02P 2101/45* (2015.01); *Y02T 10/642* (2013.01); *Y02T 10/705* (2013.01); *Y02T 10/7005* (2013.01); *Y02T 10/7044* (2013.01); *Y02T 10/7258* (2013.01); *Y10S 903/903* (2013.01)

(58) Field of Classification Search
USPC .................................... 701/22; 318/780, 515
See application file for complete search history.

(56) References Cited

U.S. PATENT DOCUMENTS

| | | |
|---|---|---|
| 2008/0170421 A1 | 7/2008 | Kishimoto et al. |
| 2009/0088294 A1 | 4/2009 | West et al. |
| 2009/0243554 A1 | 10/2009 | Gu et al. |

FOREIGN PATENT DOCUMENTS

| | | | |
|---|---|---|---|
| FR | 2934529 A1 | | 2/2010 |
| JP | 9-47055 A | | 2/1997 |
| JP | 2002-291104 A | | 10/2002 |
| JP | 2002291104 A | * | 10/2002 |
| JP | 2003-164002 A | | 6/2003 |
| JP | 2003164002 A | * | 6/2003 |
| JP | 3751736 B2 | | 3/2006 |
| JP | 2006296068 A | * | 10/2006 |
| JP | 2007-221885 A | | 8/2007 |
| JP | 2009-81958 A | | 4/2009 |
| JP | 2010-207053 A | | 9/2010 |
| JP | 2010207053 A | * | 9/2010 |
| JP | 2011155743 A | | 8/2011 |

OTHER PUBLICATIONS

Japanese Office Action (Reasons), issued Jun. 3, 2014 in Patent Application No. 2013-540537.
Communication dated Jul. 3, 2015 from the State Intellectual Property Office of People's Republic of China in counterpart Application No. 201180073634.4.
Communication dated Jul. 14, 2016 from the German Patent and Trademark Office in counterpart application No. 112011105776.8.

* cited by examiner

CONTROL APPARATUS OF ELECTRICALLY-DRIVEN VEHICLE

CROSS REFERENCE TO RELATED APPLICATIONS

This application is a National Stage of International Application No. PCT/JP2011/074609, filed on Oct. 26, 2011, the contents of all of which are incorporated herein by reference in their entirety.

TECHNICAL FIELD

The present invention relates to a control apparatus of an electrically-driven vehicle controlling an electrically-driven vehicle that includes a motor driven via an inverter by using a batter as a power supply, and more particularly, to a control apparatus of an electrically-driven vehicle that prevents overcharging of a battery.

BACKGROUND ART

Recently, hybrid electrically-driven vehicles using a motor and an engine mounted thereon or electric cars driven by a motor alone are increasing in the effort of reducing $CO_2$ emission. These electrically-driven vehicles using a motor mounted thereon include an inverter to drive the motor and a battery serving as a power supply in addition to the motor.

In these electrically-driven vehicles, the battery is charged by regenerative power generation with the aim of extending a cruising distance or with the aim of suppressing an increase of fuel consumption by the engine for power generation. In regenerative power generation, energy that is otherwise consumed as heat generated at a brake is extracted as electric energy. Hence, the cost incurred or fuel consumed by this power generation is zero. It is therefore desirable to store the power generated by regenerative power generation in the battery as much as possible.

On the other hand, many of the batteries mounted on the electrically-driven vehicle have a property that the life becomes shorter when charged with an overcurrent or overcharged. Hence, when the batteries are charged, the processing to protect the batteries from overcharging or the like is necessary.

In order to overcome this problem, Japanese Patent No. 3751736 (PTL 1) discloses a technique, according to which SOC (State of Charge) detection means for detecting an SOC (hereinafter, referred to also as a storage amount) of the battery is provided. In a braking mode in which regenerative power generation is performed, regenerative power generation is stopped when the SOC of the battery is close to a full charge and the mode is switched to countercurrent braking. In contrast to the regenerative power generation by which the battery is charged with power generated by the motor, battery power is consumed by the countercurrent braking because the motor is driven by power running. Hence, there is no risk of overcharging the battery. In this manner, the technique disclosed in PTL 1 prevents overcharging of the battery by regenerative power generation.

Also, JP-A-2003-164002 (PTL 2) discloses a technique, according to which SOC detection means for detecting an SOC of the battery is provided. In a case where it is determined that the battery cannot be charged (for example, when an SOC of the battery is close to a full charge), a three-phase short circuit is applied by short-circuiting input terminals of the motor. By applying the three-phase short circuit, power generated by the motor is consumed within the motor and is not charged to the battery. Hence, there is no risk of overcharging the battery. By configuring in this manner, overcharging of the battery by regenerative power generation is prevented.

Further, JP-A-9-47055 (PTL 3) discloses a technique, according to which overcharging is prevented by applying a three-phase short circuit when a synchronous generator is under weak field control, that is, when an inductive voltage generated by the motor is large in comparison with a voltage across the battery. In a case where an inductive voltage generated by the motor is large in comparison with a voltage across the battery as above, an amount of current to be generated cannot be controlled by the inverter. Hence, overcharging is prevented by applying a three-phase short circuit.

CITATION LIST

Patent Literature

PTL 1: Japanese Patent No. 3751736
PTL 2: JP-A-2003-164002
PTL 3: JP-A-9-47055

SUMMARY OF INVENTION

Technical Problem

Incidentally, when a rotation speed of the motor is increased, a power generation voltage (inductive voltage) of the motor is also increased proportionately. In a case where the motor is driven by power running, it is necessary to apply a voltage larger than the inductive voltage by the inverter. However, because a voltage applicable by the inverter is limited by a voltage across the battery, a rotation speed of the motor allowed by power running drive is limited.

On the other hand, there is a need for an electrically-driven vehicle driven by the motor to drive the motor by power running until the motor rotates at a high speed and this need is satisfied by weak flux control or a step-up DC-to-DC converter. The weak flux control is to control the motor to be driven by power running until it rotates at a high speed by making an inductive voltage of the motor small by changing current-passing phases and the step-up DC-to-DC converter drives the motor by power running until it rotates at a high speed by boosting a voltage across the battery. When configured in this manner, in a case where the weak flux control or boosting of the battery voltage is stopped while the motor is driven at a high speed, an inductive voltage of the motor becomes high with respect to an electromotive voltage of the battery (equivalent to an open circuit voltage of the battery).

As has been described above, when a rotation speed of the motor increases and a power generation voltage becomes larger than an electromotive voltage of the battery, power generated by the motor is charged to the battery by passing a commutation diode of the inverter. In a region where a power generation voltage of the motor becomes larger than an electromotive voltage of the battery as above, the inverter operates equivalently to a full-wave rectifier circuit and the motor cannot be driven by power running or regeneration by switching the inverter (charging to the battery is performed even when an attempt of driving by power running or regeneration is made). In a state in which the inverter operates as a full-wave rectifier circuit and driving is performed neither by power running nor by regeneration as described above, there is a problem that charging to the battery from the motor cannot be stopped by applying countercurrent braking as by the technique disclosed in PTL 1 and the battery is overcharged.

FIG. 12 is a view showing a relation between a motor rotation speed and a braking torque when a three-phase short circuit is applied by short-circuiting input terminals of the motor (in the case of a three-phase motor, three input terminals are short-circuited). As is shown in FIG. 12, the braking torque is known that the braking torque during a three-phase short circuit becomes smaller in reverse proportion to the motor rotation speed from a certain rotation speed or greater.

For example, given a case where the technique disclosed in PTL 2 is applied to an electrically-driven vehicle in which the motor and the drive wheels are connected by a single speed reducer, according to the technique disclosed in PTL 2, a three-phase short circuit is applied independently of a rotation speed of the motor when the battery cannot be charged. Hence, the motor rotation speed decreases due to the three-phase short circuit and the braking torque of the motor increases abruptly in response to a decrease of the motor rotation speed. Accordingly, the driver needs to reduce an amount of depression on the brake pedal in response to a decrease of the motor rotation speed. This results in a problem that the driver feels uncomfortable.

Further, given a case where the technique disclosed in PTL 3 is applied to a control apparatus in the electrically-driven vehicle, a three-phase short circuit is applied while an inductive voltage of the motor is large in comparison with a voltage across the battery. Hence, even when the SOC of the battery is low and there is a good capacity for overcharging, the charging to the battery is stopped. This results in a problem that regenerative power cannot be used.

The invention was devised in view of the foregoing circumstances and has an object to provide a control apparatus of an electrically-driven vehicle, which is capable of preventing overcharging of the battery even when a motor rotation speed is high and an inductive voltage of the motor is larger than a voltage across the battery without making the driver feel uncomfortable.

Solution to Problem

In order to solve the problems above, a control apparatus of an electrically-driven vehicle of the invention is a control apparatus of an electrically-driven vehicle controlling an electrically-driven vehicle that includes a motor transmitting a drive force to wheels, an inverter driving the motor, and a battery supplying power to the inverter. The control apparatus includes battery storage amount estimation means for estimating a storage amount of the battery and motor rotation speed detection means for detecting a rotation speed of the motor. Output terminals of the inverter are short-circuited when the rotation speed of the motor reaches or exceeds a predetermined rotation speed while the storage amount estimated by the battery storage amount estimation means is equal to or greater than a predetermined amount.

Advantageous Effects of Invention

According to the control apparatus of an electrically-driven vehicle of the invention, it becomes possible to provide a control apparatus of an electrically-driven vehicle, which is capable of preventing overcharging of the battery even when the motor rotates at a high speed and a voltage generated by the motor becomes equal to or higher than a voltage across the battery, so that the life of the battery is not shortened.

The foregoing and other objects features, aspects, and advantages of the present invention will become more apparent from the following detailed description of the present invention when taken conjunction with the accompanying drawings.

DESCRIPTION OF EMBODIMENTS

First Embodiment

Figure 1:
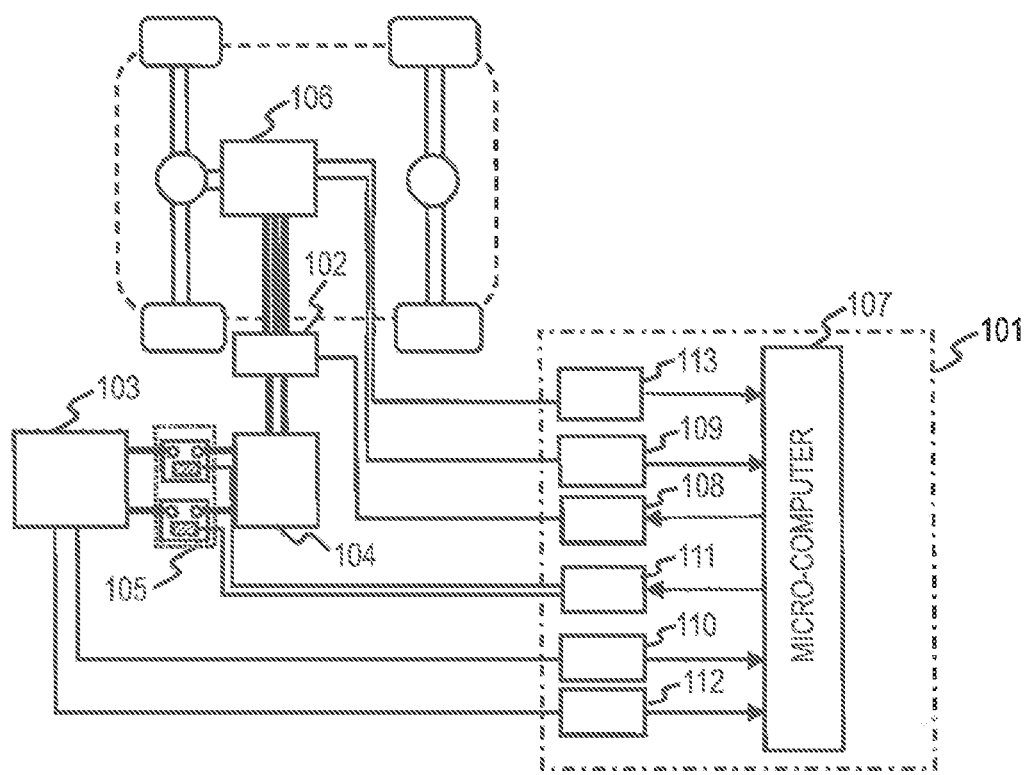
FIG. 1 is a view showing a configuration of a control apparatus of an electrically-driven vehicle according to a first embodiment of the invention.

FIG. 1 is a view showing a configuration of a control apparatus of an electrically-driven vehicle of a first embodiment.

Referring to FIG. 1, a control apparatus 101 calculates a drive torque of a motor on the basis of information, for example, an amount of depression on an unillustrated accelerator pedal and a brake stroke, and drives an inverter 102 to drive the motor at the calculated drive torque. A battery 103 supplies power to a step-up DC-to-DC converter 104 and the inverter 102. The step-up DC-to-DC converter 104 supplies power to the inverter 102 by boosting a voltage across the battery 103. A connection device (hereinafter, referred to as the contactor) 105 formed of a contactor or a relay device is provided between the battery 103 and the step-up DC-to-DC converter 104. It is configured in such a manner that the battery 103 is disconnected from the step-up DC-to-DC converter 104 and the inverter 102 when the contactor 105 is switched OFF.

The inverter 102 is formed of six switching elements, for example, IGBTs (Insulated Gate Bipolar Transistors) and converts DC power, which is an output from the step-up DC-to-DC converter 104, to three-phase AC power.

Reference numeral 106 denotes a motor. An output shaft of the motor 106 is meshed with a final gear (not shown) so that a drive force is transmitted to the wheels.

A configuration of the control apparatus 101 will now be described. The control apparatus 101 includes a micro-computer 107, inverter control means 108, motor rotation speed detection means 109, battery storage amount estimation means 110, contactor operation means 111, battery temperature measurement means 112, and rotor temperature estimation means 113.

The micro-computer 107 determines a torque at which the motor 106 is driven on the basis of information on the unillustrated accelerator pedal and a brake stroke, and gives an instruction to the inverter control means 108. The inverter control means 108 determines an operation of the switching elements of the inverter 102 so as to follow a motor torque specified by the micro-computer 107.

The motor rotation speed detection means 109 calculates a rotation speed of the motor 106 by differentiating angular information obtained by an angle sensor, for example, a resolver.

The battery storage amount estimation means 110 estimates a storage amount of the battery 103. The battery storage amount estimation means 110 sets in advance an initial value of a storage amount by measuring an open circuit voltage (OCV) of the battery 103 while the contactor 105 is switched OFF and then detects a storage amount by adding up a current value inputted into and outputted from the battery 103.

The contactor operation means 111 switches OFF the contactor 105 in a case where there is an OFF instruction for the contactor 105 from the micro-computer 107.

The battery temperature measurement means 112 measures a temperature of the battery 103. For example, a temperature sensor, such as a thermistor, is provided to each cell and a maximum value among these temperature sensors is used as the battery temperature.

The rotor temperature estimation means 113 estimates a rotor temperature of the motor 106. For example, a temperature sensor, such as a thermistor, is provided inside a stator coil of the motor 106 and the rotor temperature estimation means 113 can estimate the rotor temperature using a value of the temperature sensor by referring to a map or by applying filtering to a value of the temperature sensor.

The motor rotation speed detection means 109, the inverter control means 108, the battery storage amount estimation means 110, the contactor operation means 111, the battery temperature measurement means 112, and the rotor temperature estimation means 113 are shown separately from the micro-computer 107. These means can be internal processing of the micro-computer 107.

Figure 2:
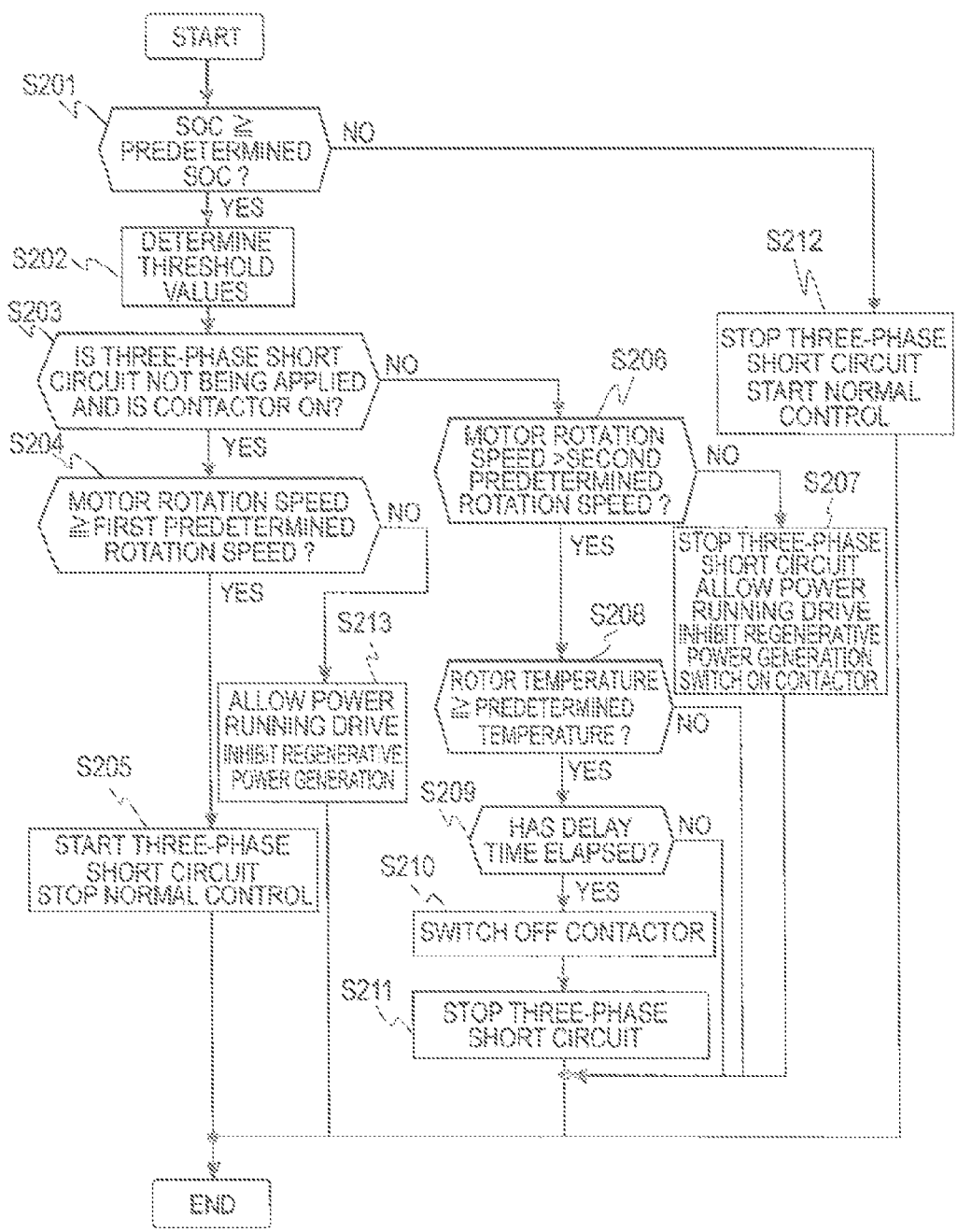
FIG. 2 is a flowchart depicting an operation of the control apparatus of an electrically-driven vehicle according to the first embodiment of the invention.

The control apparatus of an electrically-driven vehicle of the first embodiment is configured as above and an operation thereof will be described next. FIG. 2 is a flowchart depicting an operation of the control apparatus of an electrically-driven vehicle of the first embodiment. Processing depicted in this flowchart is performed by the micro-computer 107 at a constant period, for example, 10 ms.

Firstly, in Step 201, whether a storage amount of the battery 103 estimated by the battery storage amount estimation means 110 is equal to or greater than a predetermined storage amount is determined. When the storage amount of the battery 103 is equal to or greater than the predetermined storage amount, advancement is made to Step 202; otherwise, advancement is made to Step 212. The storage amount used in this determination is a storage amount slightly short of becoming overcharged, and set, for example, to about 80%. It is preferable to have one second predetermined storage amount, for example, of about 75% so that this determination is a determination with hysteresis.

In Step 202, a first predetermined rotation speed and a second predetermined rotation speed of the motor 106 are determined on the basis of the battery temperature detected by the battery temperature measurement means 112. Herein, the first predetermined rotation speed is calculated by referring to a map shown in FIG. 3 indicating a relation between the battery temperature and the first predetermined rotation speed of the motor 106. The second predetermined rotation speed is a value found by subtracting a predetermined value from the first predetermined rotation speed. The predetermined value to be subtracted is set so that the determination is a determination with hysteresis in order to prevent ON and OFF determinations from being repeated for a three-phase short circuit described below. Advancement is made to Step 203 when the first predetermined rotation speed and the second predetermined rotation speed of the motor 106 are determined.

In Step 203, a confirmation is made as to whether it is a state in which the contactor 105 is ON and a three-phase short circuit is not being applied. When a three-phase short circuit is not being applied and the contactor is ON, advancement is made to Step 204; otherwise, advancement is made to Step 206.

In Step 204, whether a rotation speed of the motor 106 is equal to or higher than the first predetermined rotation speed is determined. If this determination is true, that is, when the rotation speed of the motor 106 is equal to or higher than the first predetermined rotation speed, advancement is made to Step 205. If the determination is false, advancement is made to Step 213.

In Step 205, the micro-computer 107 stops a torque instruction according to an operation condition of the driver, which is the normal control, and instructs the inverter control means 108 to apply a three-phase short circuit. The inverter control means 108 then switches ON or OFF the switching elements so that the three output terminals of the inverter 102 are short-circuited. When the processing in Step 205 ends, advancement is made to END.

By applying a three-phase short circuit only when the motor 106 is rotating at equal to or higher than the first predetermined rotation speed in this manner, a three-phase short circuit is not applied while the motor 106 is rotating at a low speed during which the braking torque becomes large. It thus becomes possible to provide a control apparatus of an electric motor that does not make the driver feel uncomfortable.

Subsequently in Step 213, power running drive is allowed and regenerative power generation is inhibited. In this state, power running drive is performed as the driver wishes while the accelerator pedal is depressed and the vehicle is accelerating or running steadily. While the accelerator pedal is lifted and the vehicle is decelerating, all the switching elements of the inverter 102 are switched OFF and power is not generated by the motor 106. When the processing in Step 213 ends, advancement is made to END.

In Step 206, whether the rotation speed of the motor 106 is higher than the second predetermined rotation speed is determined. If this determination is true, that is, when it is determined that the rotation speed of the motor 106 is higher than the second predetermined rotation speed in a region in which the inverter 102 operates as a full-wave rectifier circuit, advancement is made to Step 208; otherwise, advancement is made to Step 207.

In Step 207, an instruction to stop the three-phase short circuit is provided. Further, power running drive is allowed and regenerative power generation is inhibited as in Step 213. Also, when the contactor 105 is OFF, the contactor 105 is switched ON. When Step 207 ends, advancement is made to END.

In Step 208, whether the rotor temperature estimated by the rotor temperature estimation means 113 is a predetermined temperature is confirmed. When the rotor temperature is equal to or higher than the predetermined temperature, advancement is made to Step 209; otherwise, advancement is made to END. The predetermined temperature used in this determination is set to a temperature not to cause irreversible demagnetization in permanent magnets used in the rotor when a three-phase short circuit is applied.

In Step 209, whether a delay time since the application of the three-phase short circuit exceeds a predetermined time is determined. When the delay time is equal to or longer than the predetermined time, advancement is made to Step 210; otherwise, advancement is made to END. The predetermined time is set to a time taken for a flowing current to become zero when a three-phase short circuit is applied while the current is flowing from the inverter 102 to the battery 103.

In Step 210, an OFF instruction is given to the contactor control means 111 to switch OFF the contactor 105. Then, advancement is made to Step 211. In Step 211, the three-phase short circuit being applied is stopped and advancement is made to END.

In this manner, the current flowing from the inverter 102 to the battery 103 becomes zero after the three-phase short circuit is applied. It thus becomes possible to switch OFF the contactor 105 without giving rise to a surge that occurs otherwise when the contactor is switched OFF.

Also, by switching OFF the contactor 105 in a state in which the rotor temperature of the motor 106 is high and by disconnecting the battery 103 from the inverter 102, it becomes possible to prevent demagnetization of the motor 106 while preventing the overcharging of the battery 103.

In Step 212, in a case where the three-phase short circuit is being applied, the three-phase short circuit is stopped and the micro-computer 107 instructs the inverter control means 108 so that a motor torque corresponding to an operation of the driver can be outputted. Also, when the contactor 105 is switched OFF, the contactor 105 is switched ON. In a case where a three-phase short circuit is not being applied, that is, in a case where a torque instruction corresponding to an operation of the driver is given, advancement is made to END.

Figure 3:
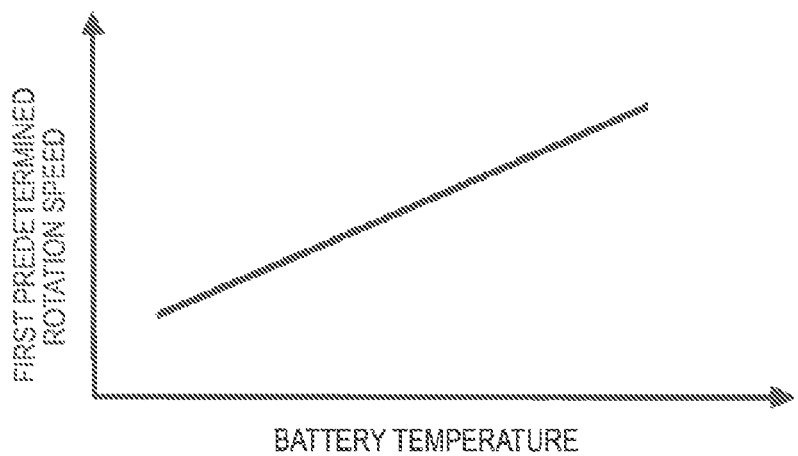
FIG. 3 is a map indicating a relation between a battery temperature and a first predetermined rotation speed of a motor.

FIG. 3 shows a map indicating a relation between the battery temperature and the first predetermined rotation speed of the motor 106. In the drawing, the battery temperature and the first predetermined rotation speed of the motor 106 have a relation expressed by a linear function. However, the relation is not necessarily expressed by a linear function. The relation is determined on the basis of an electromotive voltage (voltage across the terminals when the battery terminals are opened, that is, an open circuit voltage) and an inductive voltage of the motor 106 in a state where the battery 103 is already charged to the extent over which the battery 103 becomes overcharged.

It is known that an electromotive voltage at which the battery 103 becomes overcharged varies with a battery temperature and there is a characteristic that the battery 103 is deteriorated when the battery 103 is charged at a high voltage when the battery temperature is low. Accordingly, the map of FIG. 3 is calculated by plotting a rotation speed of the motor 106 with which an inductive voltage of the motor 106 becomes equal to or higher than an electromotive voltage at which the battery 103 become overcharged at each battery temperature. It is possible to adopt a method by which the map is calculated in advance and the first predetermined rotation speed is calculated on the basis of the battery temperature in this manner. However, calculations may be made online. As has been described, by changing the first predetermined rotation speed in response to the battery temperature, it becomes possible to provide a control apparatus of an electrically-driven vehicle, which is capable of preventing the overcharging in a reliable manner even when the battery temperature varies.

Figure 4:
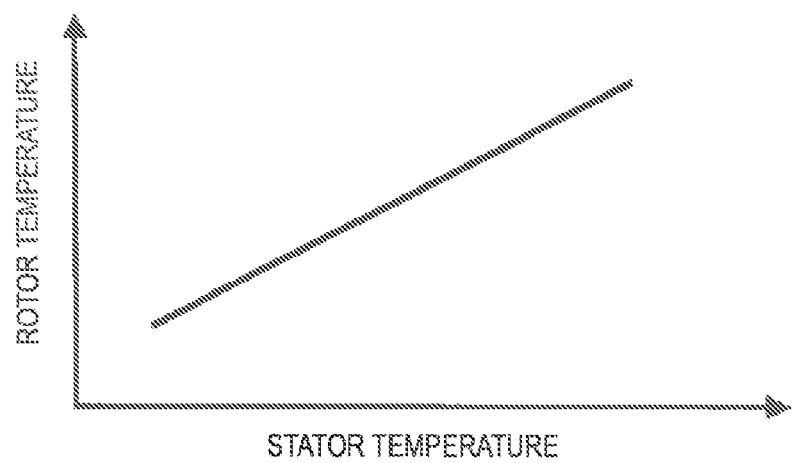
FIG. 4 is a map indicating a relation between a stator temperature and a rotor temperature of the motor.

FIG. 4 shows a map indicating a relation between the stator temperature and the rotor temperature of the motor 106. In the drawing, the relation between the stator temperature and the rotor temperature is a relation expressed by a linear function. However, the relation is not necessarily the one shown in the drawing. The map is created by driving the motor alone in advance and using a relation between the rotor temperature and the stator temperature at the time of this driving.

Figure 5:
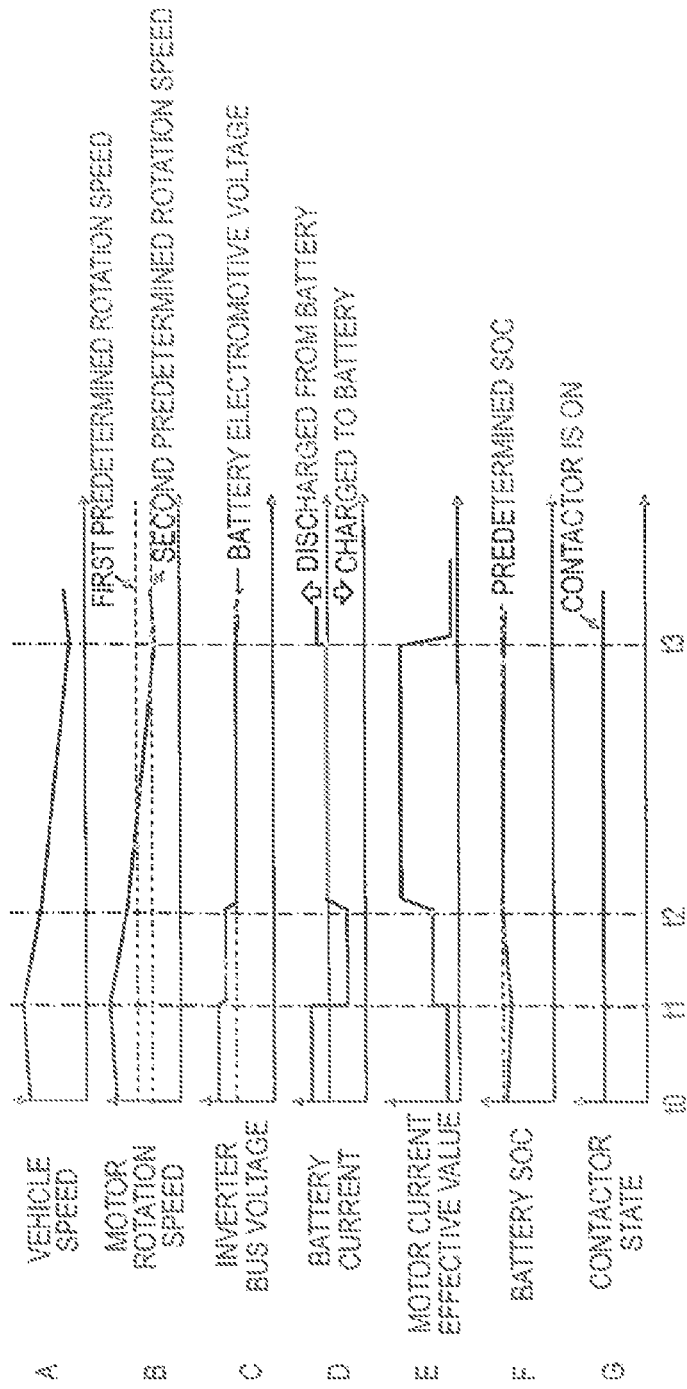
FIG. 5 is a time chart depicting an operation of an electrically-driven vehicle including the control apparatus when the rotor temperature is low.

FIG. 5 is a time chart depicting an operation of an electrically-driven vehicle including the control apparatus 101 when the rotor temperature is low.

Referring to FIG. 5, A is a chart indicating a vehicle speed of the electrically-driven vehicle. In the electrically-driven vehicle of this embodiment, because the motor 106 is connected to the wheels via the final gear with a fixed transmission gear ratio, the rotation speed of the motor 106 and the vehicle speed shape waveforms at a ratio of 1:1.

B is a chart indicating the rotation speed of the motor 106 and C is a chart indicating a bus voltage of the inverter 102. A bus voltage of the inverter 102 fluctuates with an operation condition of the step-up DC-to-DC converter 104.

D is a chart indicating a battery current. The battery current is a current flowing between the battery 103 and the step-up DC-to-DC converter 104, which is shown on the plus side when discharged from the battery 103 and on the minus side when charged to the battery 103.

E is a chart indicating a motor current effective value and it represents an effective value of a three-phase AC waveform to be passed from the inverter 102 to the motor 106.

F is a chart indicating a storage amount of the battery 103 which is calculated by the battery storage amount estimation means 110.

G is a chart indicating a state of the contactor 105. In this chart, the contactor 105 is constantly switched ON and therefore the battery 103 and the step-up DC-to-DC converter 104 are connected.

Referring to the drawing, a period from times t0 to t1 is a section in which the motor 106 is driven at a high speed by boosting a voltage across the battery 103 by the step-up DC-to-DC converter 104. In this instance, power running drive is performed by extracting power from the battery 103.

At the timing of time t1, the step-up DC-to-DC converter 104 stops the boosting operation. At this timing, the motor 106 is driven at a high speed and an inductive voltage of the motor 106 is larger than an electromotive voltage of the battery 103.

A period from times t1 to t2 is a section in which an inductive voltage of the motor 106 is larger than an electromotive voltage of the battery 103. In this section, the inverter 102 operates as a full-wave rectifier circuit and charges the battery 103. A storage amount of the battery 103 increases because it is charged.

At time t2, a storage amount of the battery 103 reaches a predetermined storage amount (for example, 80%) and a three-phase short circuit is applied to the inverter 102. A three-phase short circuit can be applied by switching ON the IGBTs on the low side and switching OFF the IGBTs on the high side.

In a section from times t2 to t3, the inverter 102 is three-phase short-circuited. While the inverter 102 is three-phase short-circuited, the bus voltage C thereof coincides with an electromotive voltage of the battery 103. Also, the battery current D becomes zero and is not charged to the battery 103.

In this manner, by applying a three-phase short circuit in a region in which the rotation speed of the motor 106 is high and an inductive voltage thereof exceeds an electromotive voltage of the battery 103, it becomes possible to stop the charging to the battery 103, which can in turn prevent overcharging of the battery 103.

The three-phase short circuit is stopped at time t3 because the motor rotation speed B becomes lower than the second predetermined rotation speed. By setting the first predetermined rotation speed and the second predetermined rotation speed in this manner, it becomes possible to provide a control apparatus of an electrically-driven vehicle in which a three-phase short circuit is not applied and stopped frequently.

At and after time t3, the motor 106 is driven in response to an operation of the driver on the acceleration pedal or a brake stroke.

Figure 6:
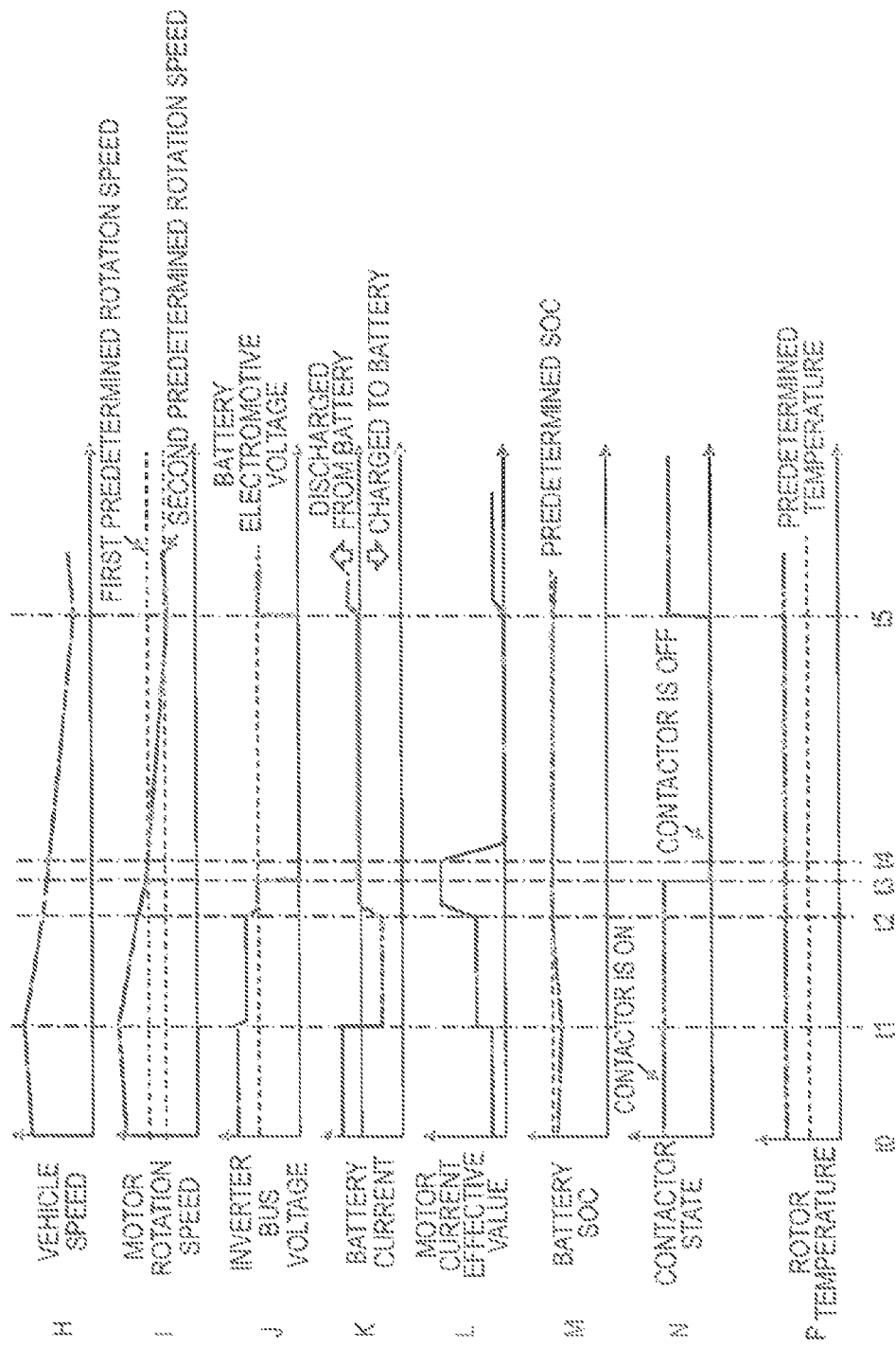
FIG. 6 is a time chart depicting an operation of the electrically-driven vehicle including the control apparatus when the rotor temperature is high.

FIG. 6 is a time chart depicting an operation of the electrically-driven vehicle including the control apparatus 101 when the rotor temperature is high.

Referring to FIG. 6, H through N correspond to A through G of FIG. 5, respectively. P represents the rotor temperature, which is a value estimated by the rotor temperature estimation means 113. In the time chart of FIG. 6, the rotor temperature P is a temperature higher than the predetermined temperature.

Referring to the drawing, operations are the same as those in FIG. 5 up to time t2. At time t3, the contactor 105 is switched OFF by the contactor operation means 111 because the delay time since the application of the three-phase short circuit at time t2 exceeds the predetermined time.

In this embodiment, the step-up DC-to-DC converter 104 and the inverter 102 alone are connected to the battery 103. However, in a case where power is supplied to electric components of the vehicle from a step-down DC-to-DC converter, it is preferable that the step-down DC-to-DC converter is also switched OFF.

The three-phase short circuit is stopped at time t4. The contactor 105 is switched OFF from times t4 to t5 and the battery 103 and the step-up DC-to-DC converter 104 are disconnected. Hence, the inverter bus voltage J is zero. In addition, because the three-phase short circuit is stopped, the motor current effective value is also zero in this section.

By switching OFF the contactor 105 after the battery current K is set to zero by applying the three-phase short circuit in this manner, it becomes possible to prevent deterioration of the battery caused by a surge that otherwise occurs when the contactor 105 is switched OFF. Also, by switching OFF the contactor 105 and stopping the three-phase short circuit while the rotor temperature P is high, it becomes possible to provide a control apparatus of an electrically-driven vehicle, which is capable of preventing overcharging of the battery 103 while preventing demagnetization of the motor 106.

At and after time t5, the motor 106 is driven in response to an operation of the driver as in the same manner at and after time t3 of FIG. 5.

Second Embodiment

A control apparatus of an electrically-driven vehicle according to a second embodiment of the invention will now be described.

Figure 7:
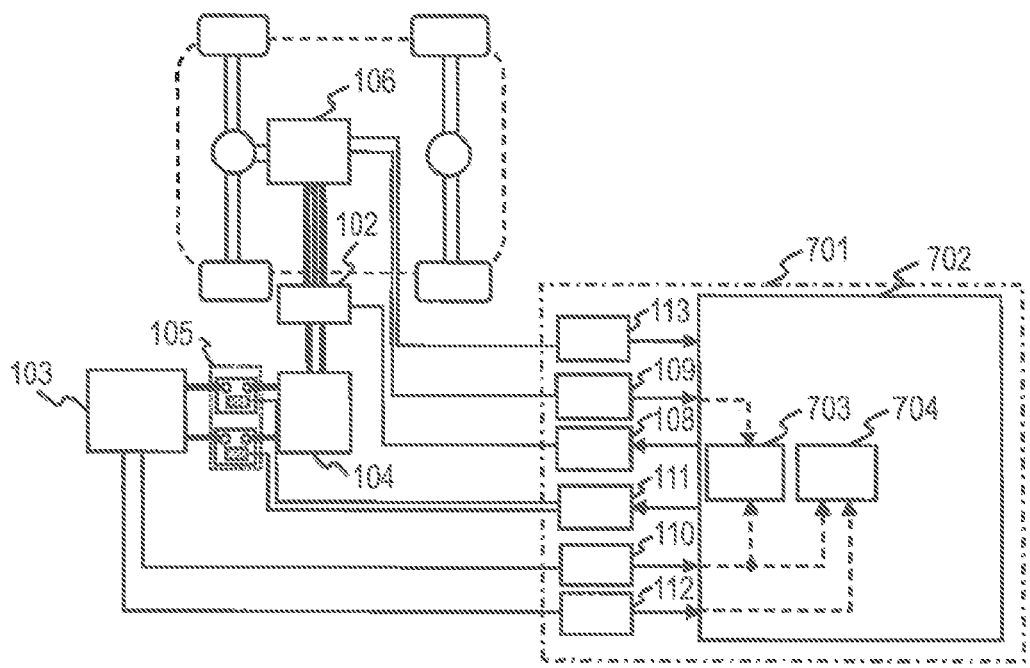
FIG. 7 is a view showing a configuration of a control apparatus of an electrically-driven vehicle according to a second embodiment of the invention.

FIG. 7 is a view showing a configuration of the control apparatus of an electrically-driven vehicle of the second embodiment. In the drawing, portions same as or equivalent to those of FIG. 1 are labeled with the same reference numerals and a description is omitted.

Referring to FIG. 7, a control apparatus 701 is of substantially the same configuration as that of the control apparatus 101 described in the first embodiment above, and includes a micro-computer 702, inverter control means 108, motor rotation speed detection means 109, battery storage amount estimation means 110, contactor operation means 111, battery temperature measurement means 112, and rotor temperature estimation means 113. It should be noted that the micro-computer 702 is different from the micro-computer 107 of the first embodiment above in that it includes charging current estimation means 703 and charging current upper limit setting means 704.

The charging current estimation means 703 estimates a current value to be charged to the battery 103 on the basis of a storage amount estimated by the battery storage amount estimation means 110 and the motor rotation speed detected by the motor rotation speed detection means 109. Also, the charging current upper limit setting means 704 sets an upper limit value of a charging current on the basis of the temperature of the battery 103 measured by the battery temperature measurement means 112 and the storage amount of the battery 103.

Figure 8:
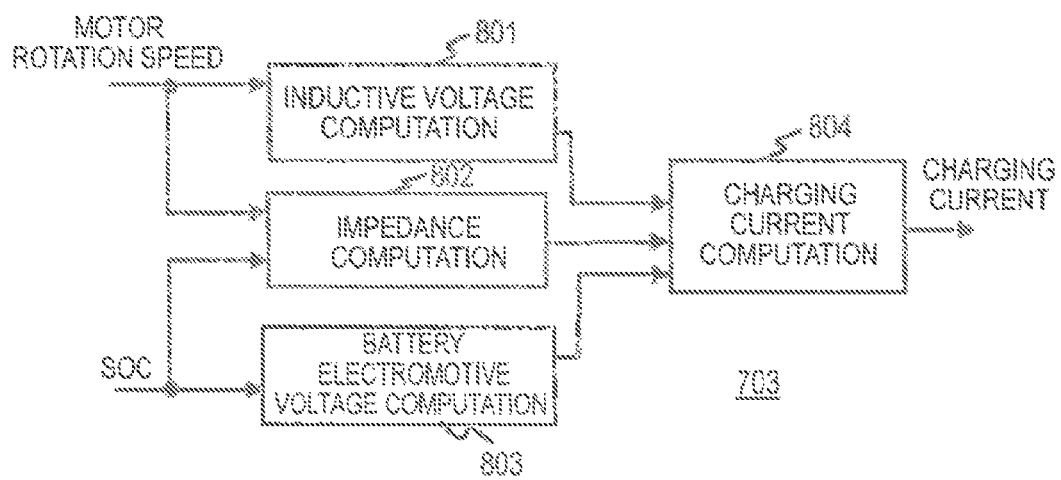
FIG. 8 is a block diagram of charging current estimation means used in the control apparatus of an electrically-driven vehicle according to the second embodiment of the invention.

FIG. 8 is a block diagram of the charging current estimation means 703. The charging current estimation means 703 includes inductive voltage computation means 801, impedance computation means 802, battery electromotive voltage computation means 803, and charging current computation means 804.

The inductive voltage computation means 801 computes an inductive voltage on the basis of the rotation speed of the motor 106. Because an inductive voltage in a permanent magnet synchronous motor can be calculated as: (rotation speed of the motor)×(permanent magnet flux), this calculation is used herein. Also, because the permanent magnet flux changes with the rotor temperature, a correction may be made according to a value of the rotor temperature estimation means 113.

The impedance computation means 802 computes impedance of the inverter 102, the motor 106, and the battery 103. Factors that determine the impedance of the inverter 102, the motor 106, and the battery 103 include resistance in a current-passing path for the inverter 102 and a resistance component and an inductance component of the coil for the motor 106. Also, the factors include internal resistance of the battery 103 for the battery 103.

From these factors, the impedance computation means 802 calculates impedance Rz in accordance with an equation as follows:

$$Rz=\sqrt{[(R1+R2+R3)2+(WL)]2}$$

where R1 is the internal resistance of the battery 103, R2 is the resistance in the current-passing path of the inverter 102, R3 is the coil resistance of the motor 106, L is the coil inductance of the motor 106, and W is the rotation speed of the motor 106.

Herein, the internal resistance R1 of the battery 103 can be found, for example, by Steps (1) through (4) as follows:

(1) an electromotive voltage of the battery 103 is calculated on the basis of the storage amount of the battery 103;

(2) an amount of current when the current flows to the inverter 102 and a voltage across the terminals of the battery 103 are measured;

(3) a voltage drop amount is calculated from a difference between the electromotive voltage calculated in (1) and the voltage across the terminals of the battery 103 obtained in (2); and (4) the internal resistance is calculated by the Ohm's law using the amount of current of the battery 103 obtained in (2) and the voltage drop amount calculated in (3) as: (internal resistance)=(voltage drop amount)/(current value).

The battery electromotive voltage computation means 803 calculates an electromotive voltage of the battery 103 on the basis of the storage amount of the battery 103. The electromotive voltage of the battery 103 varies with characteristics of the battery 103. Hence, a map is created by measuring a relation between a storage amount and an electromotive voltage of the battery 103 in advance and an electromotive voltage of the battery 103 is computed by referring to the map when the control is performed.

The charging current computation means 804 calculates a charging current in accordance with an equation below using the inductive voltage V1 computed by the inductive voltage computation means 801, the impedance Rz computed by the impedance computation means 802, and the battery electromotive voltage V2 calculated by the battery electromotive voltage computation means 803, and outputs the calculation result as an estimate value.

$$(\text{charging current})=(V1-V2)/Rz$$

Figure 9:
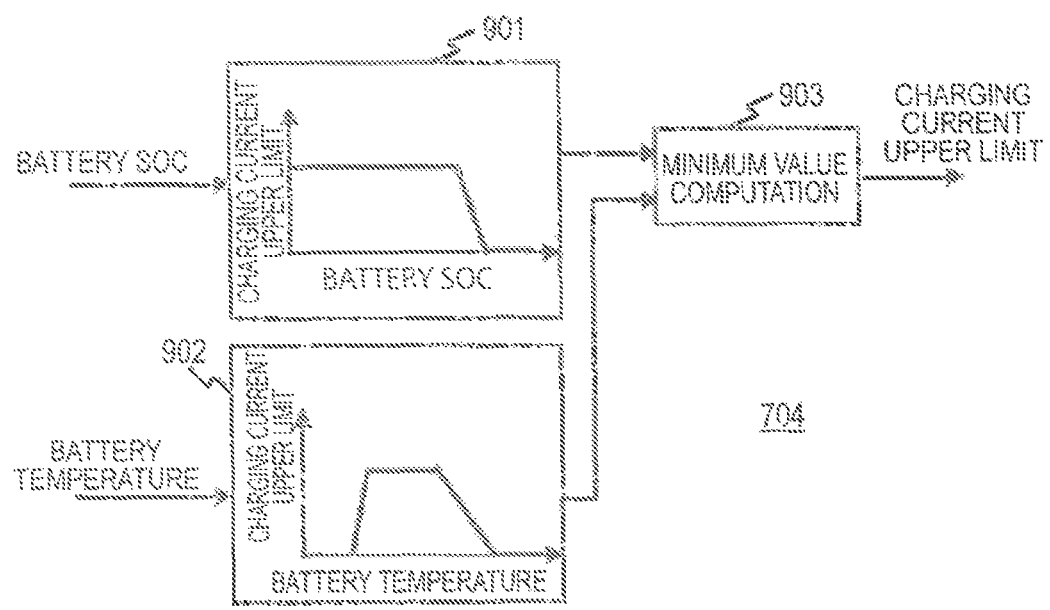
FIG. 9 is a block diagram of charging current upper limit setting means used in the control apparatus of an electrically-driven vehicle according to the second embodiment of the invention.

FIG. 9 is a block diagram of the charging current upper limit setting means 704. The charging current upper limit setting means 704 is formed of first upper limit value calculation means 901 for calculating a charging current upper limit value determined by a storage amount of the battery 103, second upper limit value calculation means 902 for calculating a charging current upper limit value determined by the battery temperature, and minimum value computation means 903.

Both of the first upper limit value calculation means 901 and the second upper limit value calculation means 902 calculate the charging current upper limit value using a map created in advance by measuring, for example, the characteristics of the battery 103. The minimum value computation means 903 outputs one of the charging current upper limit value calculated by the first upper limit value calculation means 901 and the charging current upper limit value calculated by the second upper limit value calculation means 902 whichever is the smaller, that is, whichever is the stricter limitation.

This embodiment adopts, as the charging current upper limit setting means 704, a method by which the limit values are calculated on the basis of the storage amount and the battery temperature of the battery 103, respectively, and whichever the stricter limitation is outputted. Alternatively, the upper limit value may be calculated using, for example, a two-input map of a storage amount and a battery temperature of the battery 103.

Figure 10:
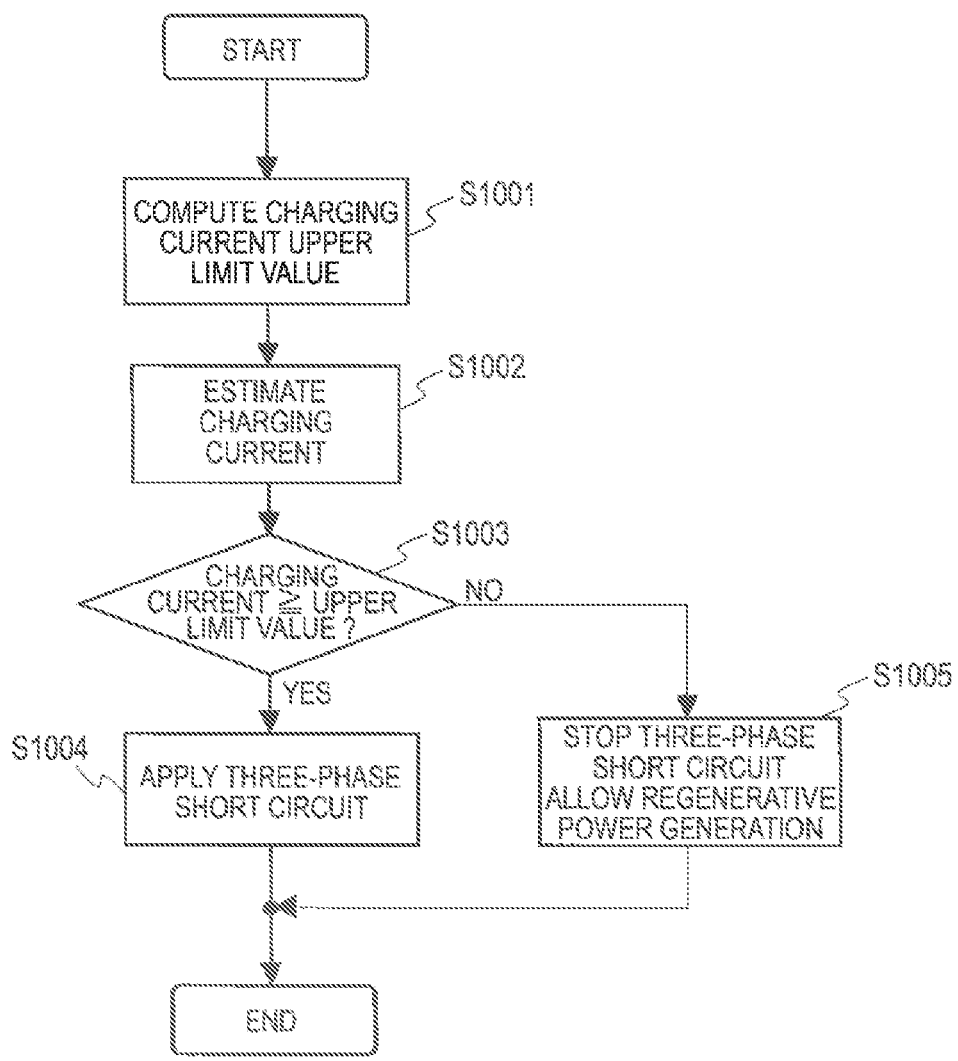
FIG. 10 is a flowchart depicting an operation of the control apparatus of an electrically-driven vehicle according to the second embodiment of the invention.

The control apparatus of an electrically-driven vehicle of the second embodiment is configured as above and an operation thereof will be described next. FIG. 10 is a flowchart depicting an operation of the control apparatus of an electrically-driven vehicle of the second embodiment.

Firstly, in Step 1001, the charging current upper limit setting means 704 computes an upper limit value of the charging current. In Step 1002, the charging current estimation means 703 estimates a charging current.

In Step 1003, whether the estimated charging current has a value equal to or greater than the upper limit value is determined. If this determination is true, that is, when the charging current has a value equal to or greater than the upper limit value, advancement is made to Step 1004. If the determination is false, advancement is made to Step 1005.

In Step 1004, a three-phase short circuit is applied because there is a possibility that the charging current to the battery 103 becomes an overcurrent. In Step 1005, regenerative power generation is allowed without applying a three-phase short circuit because the charging current to the battery 103 does not become an overcurrent.

Figure 11:
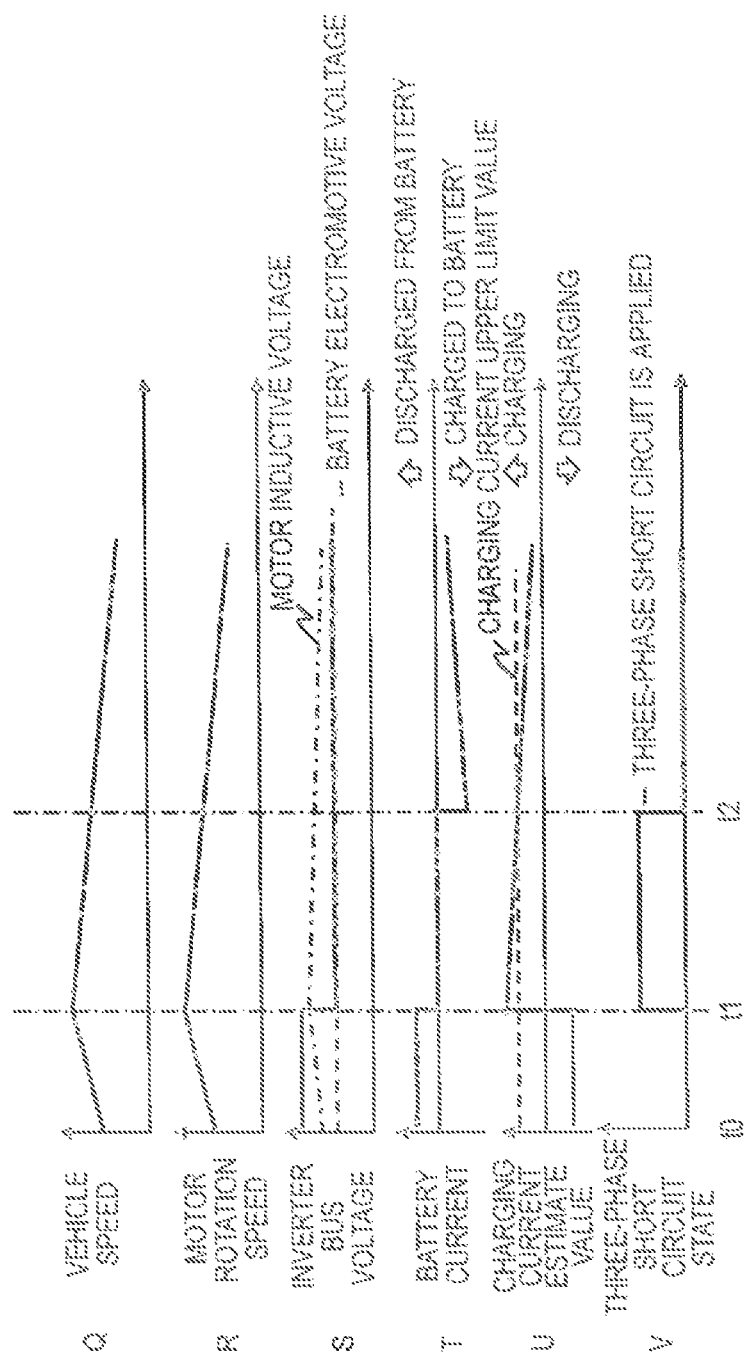
FIG. 11 is a time chart depicting an operation of an electrically-driven vehicle including the control apparatus.
Figure 12:
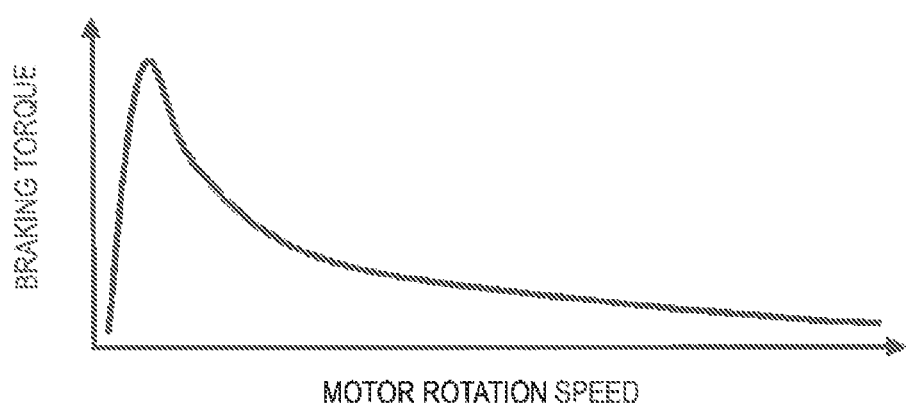
FIG. 12 is a view showing a relation between a motor rotation speed and a braking torque when a three-phase short circuit is applied.

FIG. 11 is a time chart depicting an operation of an electrically-driven vehicle including the control apparatus 701.

In FIG. 11, Q is a chart indicating a vehicle speed and R is a chart indicating a rotation speed of the motor 106. Also, S is a chart indicating a bus voltage of the inverter 102. The bus voltage of the inverter 102 becomes large with respect to a voltage across the battery 103 by boosting the voltage across the battery 103 using the step-up DC-to-DC converter 104. In the drawing, an alternate long and short dash line represents an inductive voltage of the motor 106 and a broken line represents an electromotive voltage of the battery 103.

T is a chart indicating a current of the battery 103. The current of the battery 103 is a current flowing between the battery 103 and the step-up DC-to-DC converter 104, which is shown on the plus side when discharged from the battery 103 and on the minus side when charged to the battery 103.

U is a chart indicating the charging current value estimated by the charging current estimation means 703 and the charging current upper limit value computed by the charging current upper limit setting means 704. V is a chart indicating a state as to whether a three-phase short circuit is being applied or not.

Referring to the drawing, in a period from times t0 to t1, the motor 106 is accelerating and the bus voltage of the inverter 102 is increased with respect to the electromotive voltage of the battery 103 by boosting a voltage across the battery 103 using the step-up DC-to-DC converter 104. Also, in this instance, a current T of the battery 103 is discharged from the battery 103 and a three-phase short circuit is not applied.

At time t1, the step-up DC-to-DC converter 104 stops the operation and the bus voltage S of the inverter 102 takes a value substantially equal to the value of the electromotive voltage of the battery 103. By stopping the step-up DC-to-DC converter 104 in this manner, the bus voltage of the inverter 102 becomes small in comparison with an inductive voltage of the motor 106. Also, the charging current estimate value increases at this timing in a charging direction and takes a value greater than the charging current upper limit value set according to a state of the battery 103. More specifically, a three-phase short circuit is applied at time t1 because it is determined that the battery 103 is charged with an excessively large current.

The three-phase short circuit is applied to the inverter 102 from times t1 to t2. Hence, the current T of the battery 103 becomes zero. Also, in this section, a braking force is generated due to the three-phase short circuit and the vehicle speed Q, the motor rotation speed R, and the motor inductive voltage are decreased.

Time t2 is a point at which the charging current estimate value drops below the charging current upper limit value and the three-phase short circuit is stopped at time t2. The battery 103 is charged at and after time t2 because the three-phase short circuit is stopped.

As has been described, by computing the charging current upper limit value and the charging current estimate value and applying a three-phase short circuit only in a limited case where the charging current estimate value becomes greater than the charging current upper limit value, it becomes possible to stop the charging only when the battery 103 is charged with an excessively large current. It thus becomes possible to charge the battery 103 with regenerative power while preventing deterioration of the battery 103 by the charging with an over current.

The embodiments above described a case where the electrically-driven vehicle is an electric car driven by the motor alone by way of example. However, the same advantages can be obtained when the electrically-driven vehicle is a hybrid car driven by the engine and the motor.

It should be understood that the respective embodiments of the invention described above can be combined without any restriction and the respective embodiments can be modified and omitted as the need arises within the scope of the invention.

The invention claimed is:

1. A control apparatus of an electrically-driven vehicle controlling an electrically-driven vehicle that includes a motor transmitting a drive force to wheels, an inverter driving the motor, and a battery supplying power to the inverter, the control apparatus comprising:
   a battery storage amount estimator to estimate a storage amount of the battery;
   a motor rotation speed detector to detect a rotation speed of the motor;
   a micro-computer to compare the detected rotation speed with a first predetermined rotation speed in response to the micro-computer determining that the inverter is under a normal operation without being short-circuited, and compare the detected rotation speed with a second predetermined rotation speed, which is lower than the first predetermined rotation speed, in response to the micro-computer determining that the output terminals of the inverter are short-circuited; and
   an inverter controller to short-circuit output terminals of the inverter in response to the rotation speed of the motor reaching or exceeding the first predetermined rotation speed while the estimated storage amount of the battery is equal to or greater than a predetermined amount, and
   wherein the micro-computer stops applying a short-circuit to the output terminals of the inverter in response to the rotation speed of the motor being lower than the second predetermined rotation speed.

2. The control apparatus of an electrically-driven vehicle according to claim 1, comprising:
   a battery temperature measurer to measure a temperature of the battery,
   wherein the first predetermined rotation speed is changed in response to the temperature of the battery.

3. The control apparatus of an electrically-driven vehicle according to claim 1, further comprising:
   a charging current estimator to estimate a current value to be charged to the battery on the basis of the rotation speed of the motor and the storage amount of the battery;
   a battery temperature measurer to measure a temperature of the battery; and
   a charging current upper limit setter to set an upper limit value of the current to be charged to the battery on the basis of the storage amount of the battery and the temperature of the battery,
   wherein the output terminals of the inverter are short-circuited when a value of the charging current estimated by the charging current estimator is greater than the upper limit value set by the charging current upper limit setter,
   wherein the charging current estimator, the batter temperature measurer, the charging current upper limit setter are implemented by one or more micro-computers.

4. The control apparatus of an electrically-driven vehicle according to claim 1, comprising:
   a charging current estimator to estimate a current value to be charged to the battery on the basis of the rotation speed of the motor and the storage amount of the battery;
   a battery temperature measurer to measure a temperature of the battery; and
   a charging current upper limit setter to set an upper limit value of the current to be charged to the battery on the basis of the storage amount of the battery and the temperature of the battery,
   wherein the output terminals of the inverter are short-circuited when a value of the charging current estimated by the charging current estimator is greater than the upper limit value set by the charging current upper limit setter,
   wherein the first predetermined rotation speed is changed in response to the temperature of the battery, and
   wherein the charging current estimator, the battery temperature measurer, the charging current upper limit setter are implemented by one or more micro-computers.

5. A control apparatus of an electrically-driven vehicle controlling an electrically-driven vehicle that includes a motor transmitting a drive force to wheels, an inverter driving the motor, and a battery supplying power to the inverter, the control apparatus comprising:
   battery storage amount estimator to estimate a storage amount of the battery;
   a motor rotation speed detector to detect a rotation speed of the motor;
   a micro-computer to compare the detected rotation speed with a first predetermined rotation speed in response to the micro-computer determining that the inverter is under a normal operation without being short-circuited, and compare the detected rotation speed with a second predetermined rotation speed, which is lower than the first predetermined rotation speed, in response to the micro-computer determining that the output terminals of the inverter are short-circuited;
   a connection device to turn ON and OFF a connection of the battery and the inverter; and an inverter controller to short-circuit output terminals of the inverter in response to the rotation speed of the motor reaching or exceeding the first predetermined rotation speed while the estimated storage amount of the battery is equal to or greater than a predetermined amount, and wherein the connection device is switched OFF after an elapse of a predetermined time since the output terminals of the inverter are short-circuited in response to the detected rotation speed reaching or exceeding the second predetermined rotation speed and a rotor temperature of the motor being equal to or higher than a predetermined temperature.

6. A control apparatus of an electrically-driven vehicle controlling an electrically-driven vehicle that includes a motor transmitting a drive force to wheels, an inverter driving the motor, and a battery supplying power to the inverter, the control apparatus comprising:

a battery storage amount estimator to estimate a storage amount of the battery;

a motor rotation speed detector to detect a rotation speed of the motor;

a micro-computer to compare the detected rotation speed with a first predetermined rotation speed in response to the micro-computer determining that the inverter is under a normal operation without being short-circuited, and compare the detected rotation speed with a second predetermined rotation speed, which is lower than the first predetermined rotation speed, in response to the micro-computer determining that the output terminals of the inverter are short-circuited;

a connection device to turn ON and OFF a connection of the battery and the inverter;

a rotor temperature estimator to estimate a rotor temperature of the motor; and an inverter controller to short-circuit output terminals of the inverter in response to the rotation speed of the motor reaching or exceeding the first predetermined rotation speed while the estimated storage amount of the battery is equal to or greater than a predetermined amount, wherein the connection device is switched OFF after an elapse of a predetermined time since the output terminals of the inverter are short-circuited in response to the detected rotation speed reaching or exceeding the second predetermined rotation speed and the rotor temperature being equal to or higher than a predetermined temperature.

7. The control apparatus of an electrically-driven vehicle according to claim 1, wherein the output terminals of the inverter stop being short-circuited in response to the detected rotation speed reaching or exceeding the second predetermined rotation speed and a rotor temperature of the motor being equal to or higher than a predetermined temperature while the estimated storage amount is equal to or greater than a predetermined amount.

8. The control apparatus of an electrically-driven vehicle according to claim 7, wherein the output terminals of the inverter stop being short-circuited only after a predetermined time period elapses since the output terminals of the inverter are short-circuited.

* * * * *